INVENTORS
GEORGE N. CHATHAM
O. O. SHURTLEFF

INVENTORS
GEORGE N. CHATHAM
O O SHURTLEFF
BY

Brown, Critchlow, Flick & Peckham
ATTORNEYS

United States Patent Office 3,096,790
Patented July 9, 1963

3,096,790
FLUID PRESSURE OPERATED VALVES
George N. Chatham and O O Shurtleff, Austin, Tex., assignors to Chatleff Controls, Inc., Austin, Tex., a corporation of Texas
Filed July 6, 1961, Ser. No. 122,264
3 Claims. (Cl. 137—628)

This invention relates to valves that are actuated by fluid pressure differences, and more particularly to three-way valves especially designed for use in reversing valves.

One place where reversing valves are used extensively is in refrigeration systems, in which the essential periodic defrosting of the evaporator can be accomplished by reversal of the flow direction of the refrigerant. This reversal directs the full flow of the hot compressed refrigerant gas to the evaporator. Another application is in heat pump systems, where at one time a cooling effect is desired and at other times a heating effect. Many valves have been designed for this purpose, but all of them have shortcomings of one form or another. The fault often lies in the three-way valve that forms part of the reversing valve.

It is among the objects of this invention to provide an improved three-way valve, which is of simple and inexpensive construction, which operates equally well in either valving direction, which is actuated by moderate differences in fluid pressure and small flows, which will continue to operate satisfactorily under overload conditions of both flow and pressure, which produces small pressure drop, which will operate when mounted in any position, and which is especially suitable for use in a four-way reversing valve. Further objects are to provide a reversing valve that will not malfunction or fail on account of overloading in pressure or flow, which is not sensitive to variations in pressure of the high and low pressure fluid, which works with increasing force as the pressure difference increases, which will operate properly in the presence of minor deficiencies in the performance of various types of actuating pilot valves, and which is symmetrical in construction about a central transverse plane.

The invention is illustrated in the accompanying drawings; in which

Figure 1:
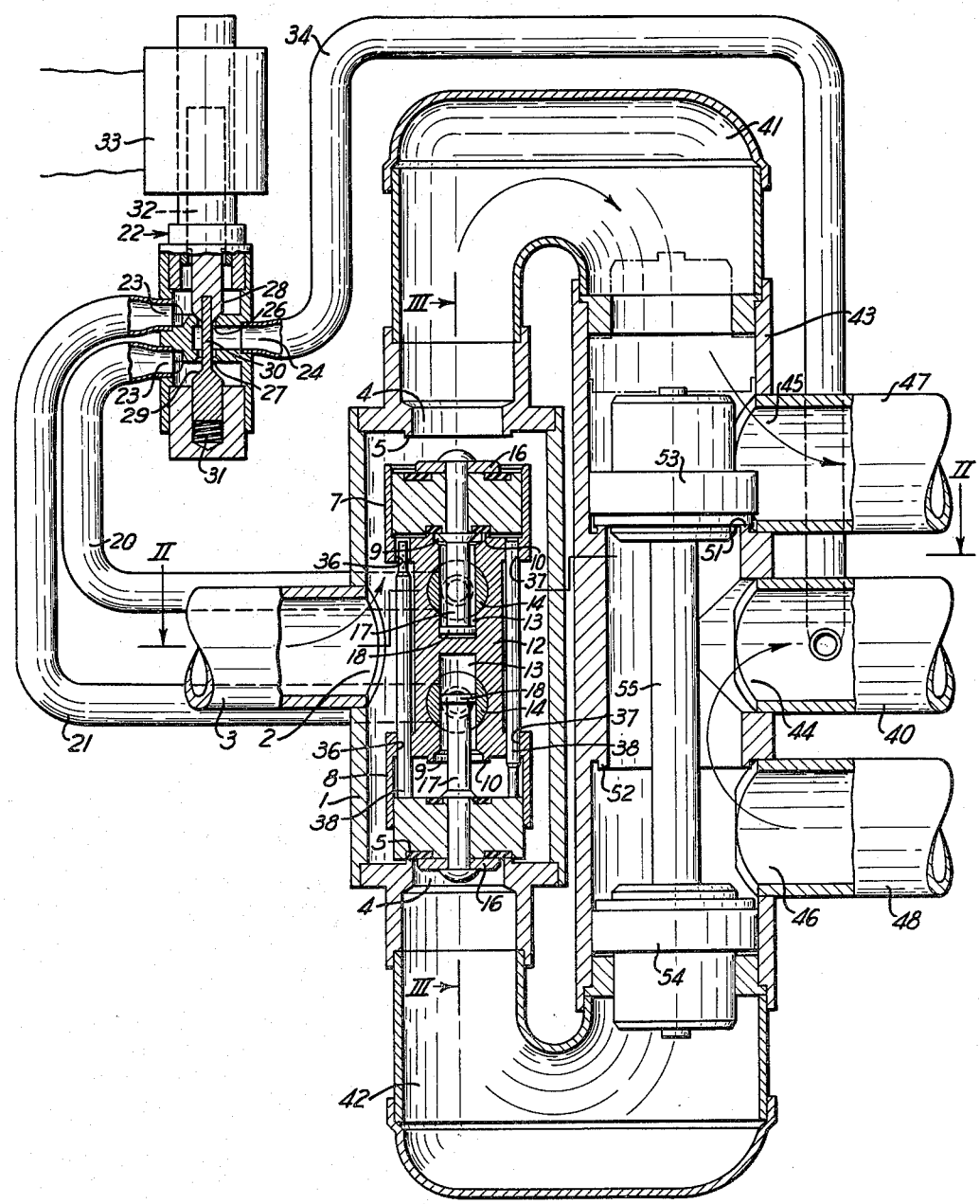
Figure 2:
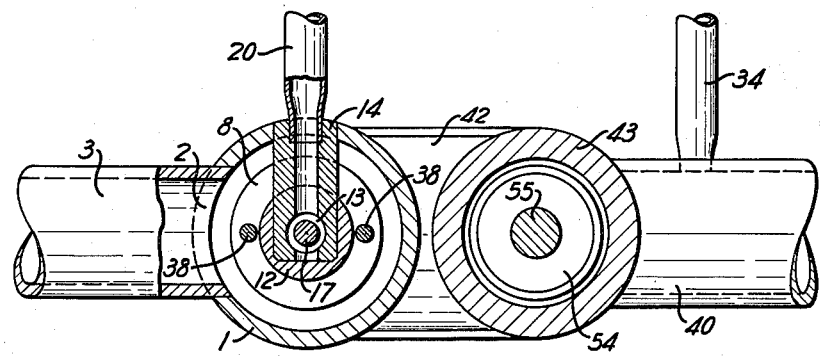
Figure 3:
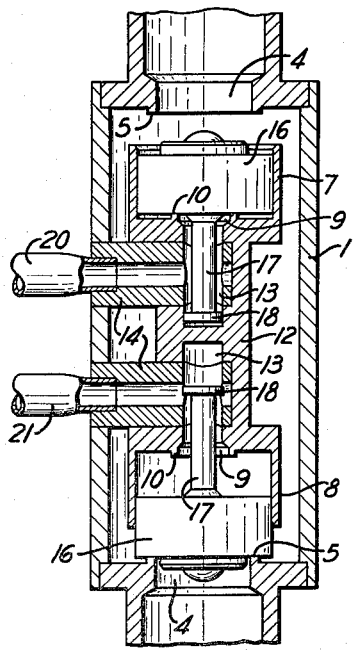

FIG. 1 is a longitudinal section through our valve;
FIG. 2 is a cross section taken on line II—II of FIG. 1; and
FIG. 3 is a fragmentary longitudinal section through the three-way valve turned on its axis 90° from the position shown in FIG. 1.

Referring to the drawings, the straight tubular housing 1 of a three-way valve is provided in its side, preferably midway between its ends, with an inlet port 2 that can be connected by a pipe 3 with a source of fluid under pressure. The opposite ends of the housing are provided with axially aligned outlet ports 4, surrounded inside the chamber by valve seats 5.

Rigidly mounted inside the housing is a pair of cylinders 7 and 8 that are disposed in axial alignment with outlet ports 4, from which the open outer ends of the cylinders are spaced. Each cylinder has in its inner end a central outlet opening 9 that is encircled inside the cylinder by a valve seat 10 spaced from the side wall of the cylinder. The cylinders can conveniently be formed on the opposite ends of connecting means 12 provided with a pair of axially spaced bores 13, the outer ends of which open into cylinder outlet openings 9. Connecting means 12 may be rigidly mounted in the valve housing in various ways. As shown in FIG. 3, one suitable way is to provide the side wall of the connecting means with openings that tightly receive the inner ends of a pair of short rigid nipples 14, the outer ends of which are sealed in openings in the side wall of the housing to support cylinders 7 and 8 in fixed positions. The nipples also put outlet openings 9 of the cylinders in communication with the outside of the housing.

Mounted in each cylinder is a piston valve member 16 that is adapted to alternately close the adjacent outlet port 4 and outlet opening 9 by sliding back and forth in the cylinder. To help guide the pistons, they may be provided at their inner ends with stems 17 that extend into the bores 13 in the intermediate connecting means 12 and that have heads 18 on their inner ends for loosely engaging the walls of the bores.

The outer ends of nipples 14 are connected by a pair of tubes 20 and 21 to a three-way pilot valve 22 of any suitable construction and mode of actuation. The one shown as an example is an electric valve that has two inlets 23 and one outlet 24. The tubes 20 and 21 are connected to the inlets 23, which communicate with the outlet 24 through upper and lower ports 26 and 27. These ports are closed alternately by valve members 28 and 29, respectively, connected by a pin 30 of smaller diameter than the ports. The lower valve member 29 normally rests on a coil spring 31 that is not strong enough to lift the entire valve assembly and a solenoid core 32 connected to the upper valve member 28. The core extends into a solenoid coil 33 which, when energized, will lift the core to open the upper port 26 and close the lower one 27. The outlet 24 of this valve is connected by a tube 34 to a region of lower fluid pressure than the pressure in the main housing 1 so that, depending on which tube 20 or 21 is connected through the tube 34 to the low pressure, the fluid pressure will be reduced in the corresponding cylinder 7 or 8, thereby permitting the higher fluid pressure against the outer end of the piston valve 16 in that cylinder to move the piston inward.

The inner ends of cylinders 7 and 8 are provided with aligned passages 36 and 37 beside their outlet openings 9. Preferably, there are only two such passages in each cylinder and they are 180° apart. Disposed between the piston valve members 16 are parallel push rods 38 that have their ends slidably mounted in the cylinder passages for movement lengthwise therein. The rods are longer than the space between valve seats 10, but they are not long enough to hold one of the piston valves against an outlet port seat 5 while the other piston engages the inner end of its cylinder. That would require too accurate machining of parts in order for both piston valves to seat simultaneously. The rods are only long enough to permit an inwardly moving piston valve to push the other piston outward from its cylinder seat to a point near enough to the adjacent outlet port for the fluid stream flowing out through that port to draw the piston the rest of the way and close the port. It will be seen that the push rods do not tie pistons 16 together and only engage both of them simultaneously during part of the time while the pistons are shifting their positions. Each cylinder is exposed to the fluid pressure in housing 1 while the piston in that cylinder is near the valve seat 10 therein. This is accomplished by so forming the adjacent end portion of at least one of the push rods as to permit fluid to flow through the surrounding passage 36 until after the piston has moved away from its seat 10. A simple way of doing this is to reduce the diameter of the end portion of a rod, as shown in FIG. 1.

It will be seen that the valve housing is symmetrical about a central transverse plane and that the movable parts likewise are symmetrical about their central plane parallel to the valve seats. This makes it easier and less expensive to build the valve with fewer tooling setups, and it also makes it possible to reduce parts inventory by almost half, as compared with an asymmetrical valve.

Another advantage of its symmetry is that the valve operates equally well for either direction of fluid flow. Also, it may be mounted in any position without any significant change in operating characteristics.

The pilot operated three-way valve that has been described can be used in any system where there is a lower pressure region to which pilot valve tube 34 can be connected. The valve is especially suitable for use as the first section of a four-way reversing valve, such as used in refrigeration systems, in which case the outlet ports 4 are connected by short tubular fittings 41 and 42 to the opposite inlet ends of a second straight tubular housing 43. The side of this housing is provided with three longitudinally spaced lateral ports. The middle port 44 may be connected by a pipe 40 with the inlet of a refrigerant compressor (not shown), the outlet of which is connected with inlet pipe 3 of the three-way valve, and the two outer ports 45 and 46 will then be connected by pipes 47 and 48, respectively, to an evaporator and a condenser (not shown) that are connected in series in a well-known manner.

The central portion of valve housing 43 has valve seats 51 and 52 located between middle port 44 and the other two ports and facing the inlet ends of that housing. A spool valve in the housing can engage the two seats alternately. It includes a pair of piston-like closure members 53 and 54 slidably mounted in the housing and spaced apart by a rod 55 long enough to hold one closure member between an inlet end of the housing and the nearest port when the other closure is seated.

With the parts of the valves in the positions shown in FIG. 1, high pressure fluid coming through pipe 3 enters housing 1 of the three-way valve section of the reversing valve and flows through the open upper outlet 4 and then around through fitting 41 into the second valve housing 43. The high fluid pressure holds the spool valve against seat 51, so the fluid flows out of the housing through port 45 and ultimately it flows back at lower pressure through port 46 and then out through the middle port 44 to the inlet of a compressor (not shown) connected with pipe 3. The piston ends of the spool valve do not fit housing 43 tightly, so the lower pressure at middle port 44, by leakage around closure member 54, reduces the pressure in fitting 42 and thereby helps to hold lower piston valve 16 firmly against lower seat 5. The upper piston valve member 16 is held on upper seat 10 by the difference in fluid pressure above and below it, because cylinder 7 is connected through tubes 20 and 34 with the low pressure in pipe 40. The closing of the upper outlet opening 9 by piston 16 prevents fluid in housing 1 from escaping through tube 20.

When the pilot valve is operated to shift to its other position, the low pressure region at outlet port 44 is connected through tube 34 and the pilot valve and tube 21 with the inner or upper end of cylinder 8, thereby quickly reducing the pressure in the cylinder so that the piston 16 therein will move inwardly to the adjacent seat 10. As the piston rises, it pushes push rods 38 against the other piston, which can easily be unseated by them because its bottom is exposed by means of open passage 36 to the fluid pressure in housing 1. Although passage 36 is soon closed by the larger part of the rod therein, the area in cylinder 7 beneath the piston will remain at a considerably higher pressure than the corresponding area in the other cylinder, which is connected with low pressure pipe 40. The upper piston is moved upwardly by the rods until the lower piston reaches the upper end of cylinder 8. By that time, the upper piston is close enough to upper seat 5 for the fluid still flowing therethrough to draw the piston the rest of the way to the seat. All of the fluid then flows out of housing 1 through the lower outlet port 4 and around through fitting 42 to housing 43, where it rapidly moves closure member 54 against seat 52 and simultaneously moves closure 53 into the dotted line position between port 45 and the corresponding end of the housing. The pattern of fluid flow during this movement is such that it is impossible for the spool valve to stop in an intermediate position. The fluid then flows out through port 46, back to port 45 and then out through the middle port 44, thereby reversing the flow in pipes 47 and 48. Due to the previously mentioned loose fit of the piston ends 53 and 54 of the spool valve in housing 43, upper tubular fitting 41 now will be in communication with the low pressure in suction pipe 40, which will help to hold upper piston 16 against seat 5 above it.

Another advantage of not connecting the two piston valve members 16 rigidly together is that the delay in the closing of an outlet port 4, created by requiring the gas stream to move the adjacent piston 16 into seating position, provides a cushioning effect on the spool valve in housing 43. That is, the high pressure fluid is not suddenly cut off from the port 4, through which it was flowing, so for a brief moment the fluid stream is allowed to impinge upon both ends of the spool valve simultaneously. This produces a cushion and reduces the impact of seating that valve.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A three-way valve for a fluid pressure line containing compressible fluid, comprising a housing provided with two aligned end outlet ports and with an inlet port between them, valve seats in the housing around the outlet ports, a pair of cylinders rigidly mounted in the housing between said outlet ports in axial alignment therewith, the outer ends of the cylinders being open and spaced from the adjacent outlet ports, each cylinder also having in its inner end a central outlet opening encircled inside the cylinder by a valve seat, a piston valve member slidably mounted in each cylinder and having outer and inner ends for closing the adjacent outlet port and outlet opening alternately, the outer end of each valve member projecting laterally beyond the valve seat around the outlet port closed by that member, a pair of conduits sealed in the wall of the housing and each having an inner end communicating with the outlet opening of one of said cylinders, the inner ends of the cylinders being provided with aligned passages therethrough beside said outlet openings, and parallel push rods disposed between the piston valve members with their ends in said passages for movement lengthwise therein, the rods being only long enough to push a piston valve member outward from its cylinder seat to a point near the adjacent outlet port when the other piston valve member moves inward from the other outlet port seat to the adjacent cylinder seat, a rod end portion at each cylinder being reduced in diameter for a distance sufficient to expose the surrounding passage to the fluid pressure in the housing only while the piston valve member in that cylinder is near the valve seat therein, and the outer ends of said conduits being adapted to be connected alternately with a region of lower fluid pressure than the pressure in said housing to cause said piston valve members alternately to move inwardly into engagement with said cylinder seats.

2. A three-way valve for a fluid pressure line containing compressible fluid, comprising a housing provided with two aligned end outlet ports and with an inlet port between them, valve seats in the housing around the outlet ports, a pair of axially spaced cylinders disposed in the housing between said outlet ports in axial alignment therewith, the outer ends of the cylinder being open and spaced from the adjacent outlet ports, each cylinder also having in its inner end a central outlet opening encircled inside the cylinder by a valve seat spaced from the side wall of the cylinder, connecting means between the cylinders and joined thereto around said outlet openings, said means being provided with a pair of separate bores each connected to one of said outlet openings, a pair of conduits extending through the wall of said housing and each communicating with one of said bores, said connecting means being rigidly mounted in the housing, a piston valve member slidably mounted in each cylinder and having outer and inner ends for closing the adjacent outlet port and outlet opening alternately, the outer end of each valve member projecting laterally beyond the valve seat around the outlet port closed by that member, the inner ends of the cylinders being provided with aligned passages therethrough beside said outlet openings, and parallel push rods disposed between the piston valve members with their ends in said passages for movement lengthwise therein, the rods being only long enough to push a piston valve member outward from its cylinder seat to a point near the adjacent outlet port when the other piston valve member moves inward from the other outlet port seat to the adjacent cylinder seat, a rod end portion at each cylinder being reduced in diameter for a distance sufficient to expose the surrounding passage to the fluid pressure in the housing only while the piston valve member in that cylinder is near the valve seat therein, and the outer ends of said conduits being adapted to be connected alternately with a region of lower fluid pressure than the pressure in said housing to cause said piston valve members alternately to move inwardly into engagement with said cylinder seats.

3. A three-way valve according to claim 2, in which the inner end portions of said conduits rigidly support said connecting means in the valve housing.

References Cited in the file of this patent

UNITED STATES PATENTS

| | | |
|---|---|---|
| 2,823,691 | Chatham et al. | Feb. 18, 1958 |
| 2,927,606 | Matcbelt et al. | Mar. 8, 1960 |
| 3,039,491 | Raney | June 19, 1962 |
| 3,051,188 | Tilney | Aug. 28, 1962 |